US007860050B2

(12) United States Patent
Cho et al.

(10) Patent No.: US 7,860,050 B2
(45) Date of Patent: Dec. 28, 2010

(54) METHOD AND APPARATUS FOR TRANSMITTING/RECEIVING BROADCAST CHANNEL IN CELLULAR WIRELESS COMMUNICATION SYSTEM SUPPORTING SCALABLE BANDWIDTH

(75) Inventors: Joon-Young Cho, Suwon-si (KR); Kyeong-In Jeong, Hwaseong-si (KR); Ju-Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 713 days.

(21) Appl. No.: 11/865,467

(22) Filed: Oct. 1, 2007

(65) Prior Publication Data

US 2008/0081603 A1 Apr. 3, 2008

(30) Foreign Application Priority Data

Sep. 29, 2006 (KR) .................. 10-2006-0096278

(51) Int. Cl.
*H04Q 7/00* (2006.01)
*H04Q 7/20* (2006.01)
(52) U.S. Cl. .................................. 370/328; 455/422.1
(58) Field of Classification Search .................. None
See application file for complete search history.

(56) References Cited

FOREIGN PATENT DOCUMENTS

KR 1020070077023 7/2007

OTHER PUBLICATIONS

Kapseok Chang et al., "Open-Loop Transmit Diversity for Broadcast Channel Transmission in E-UTRA", Vehicular Technology Conference, Sep. 30, 2007-Oc. 3, 2007, p. 1293-1297.*

Yoshihisa Kishiyama et al., "Invetigations on Broadcast Channel Structure in OFDM-Based Evolved UTRA Downlink", IEIC Technical Report, vol. 106, No. 360, p. 83-87.*
Mihyun Lee et al. "Proposed SDD text changes for Broadcast Channel", IEEE 802.16 Broadband Wireless Access Working Group, Sep. 17, 2008.*
Mihyun Lee et al. "Proposed text for Broadcast Channel (BCH)", IEEE 802.16 Broadband Wireless Access Working Group, Oct. 31, 2008.*
CATT: "Measurement Types for Mobility", 3GPP TSG RAN WG2#52, R2-060992, Athens, Greece, Mar. 27-31, 2006.
Sharp: "Physical Allocation of PCH for 20 MHZ Operating Bandwidth", 3GPP TSG-RAN WG1 LTE Ad-Hoc, R1-061683, Cannes, France, Jun. 27-30, 2006.

* cited by examiner

*Primary Examiner*—Ayaz R Sheikh
*Assistant Examiner*—Blanche Wong
(74) *Attorney, Agent, or Firm*—The Farrell Law Firm, LLP

(57) ABSTRACT

A method and apparatus for transmitting/receiving broadcast channels carrying downlink system information in an Orthogonal Frequency Division Multiplexing (OFDM)-based cellular wireless communication system supporting a scalable bandwidth. The method includes mapping first primary broadcast channel (P1-BCH) symbols including basic system information to a middle band centered at a center frequency of a system band and having a broadcast channel (BCH) transmission bandwidth, and mapping second primary broadcast channel (P2-BCH) symbols including core system information excluding the basic system information to first and second transmission bands that have the BCH transmission bandwidth and locate within both bands adjoining the center frequency on both sides thereof and having a minimum reception bandwidth supportable by User Equipments (UEs) within a cell respectively, when a bandwidth of the system band is at least two times of a minimum reception bandwidth. In this way, the method and system facilitates a UE to move between cells.

25 Claims, 13 Drawing Sheets

METHOD AND APPARATUS FOR TRANSMITTING/RECEIVING BROADCAST CHANNEL IN CELLULAR WIRELESS COMMUNICATION SYSTEM SUPPORTING SCALABLE BANDWIDTH

PRIORITY

This application claims priority under 35 U.S.C. §119 to an application filed in the Korean Industrial Property Office on Sep. 29, 2006 and assigned Serial No. 2006-0096278, the contents of which are hereby incorporated by reference.

BACKGROUND OF THE INVENTION

1. Field of the Invention

The present invention generally relates to a cellular wireless communication system, and more particularly to a method and system for transmitting/receiving a common control channel for the transmission of downlink system information, in particular, a broadcast channel.

2. Description of the Related Art

In recent years, Orthogonal Frequency Division Multiplexing (OFDM) technology has been widely employed in broadcasting and mobile communication systems. OFDM technology is advantageous in that it removes interference between multi-path signal components existing in a radio communication channel, ensures orthogonality between multiple access users, and enables frequency resources to be efficiently used. On account of this, OFDM technology is useful for high-speed data transmission and wideband systems, as compared with Direct Sequence Code Division Multiple Access (DS-CDMA) technology, such as Wideband Code Division Multiple Access (WCDMA), CDMA2000 or the like.

FIG. 1 shows a conventional OFDM signal structure in the time-frequency domain.

In FIG. 1, one OFDM symbol 100 occupies N subcarriers 102 in the frequency domain. Individual modulation symbols 104 for transmission information are carried and simultaneously transmitted in parallel by the respective subcarriers 102. A modulation symbol 104 transmitted by each subcarrier 102 is referred to as a subcarrier symbol. The OFDM technology as described above is a type of multicarrier transmission technology in which data or control channel information to be transmitted can be separately carried and transmitted in parallel by several subcarriers. In FIG. 1, reference numerals "106" and "108" designate ith and (i+1)th OFDM symbol intervals, respectively. Each physical channel in an OFDM-based communication system includes one or more subcarrier symbols 104.

One of important features of an OFDM-based cellular wireless communication system for providing a high-speed wireless data service is to support a scalable bandwidth. A system based on the scalable bandwidth can use various bandwidths including bandwidths of 20/15/10/5/2.5/1.25 megahertz (MHz), etc. A service provider can provide each cell with a service by using a bandwidth selected from among such various bandwidths, and there may be many kinds of User Equipment (UE) from a UE enabling a service with a bandwidth up to 20 MHz to a UE supporting only a minimum bandwidth of 1.25 MHz.

In a scalable bandwidth-based system, a UE initially accessing the system must succeed in a cell search without knowing a system bandwidth. Through the cell search, the UE acquires a cell identifier (ID) and synchronization between a transmitter and a receiver for data and control information demodulation. The system bandwidth may be acquired from a synchronization channel (SCH) in the middle of the cell search, or may be acquired by decoding a broadcast channel (BCH), which is a common control channel for system information transmission, after the cell search.

The BCH is a channel for transmitting system information of a cell that the UE accesses, and the UE initially demodulate the BCH after the cell search is finished. Accordingly, the UE initially performs a cell search through the SCH. After successfully searching for a cell, the UE acquires system information for the cell by receiving the BCH. By reading the BCH, the UE acquires system information necessary for receiving a data channel and other control channels, such as a cell ID, a system bandwidth, channel setup information, etc., cell by cell.

FIG. 2 a conventional example of mapping frequency resources of an SCH 204 and a BCH 206 according to system bandwidths in a system supporting a scalable bandwidth.

In FIG. 2, the abscissa axis 200 represents a frequency, and the SCH 204 and the BCH 206 are transmitted with a bandwidth of 1.25 MHz in the center of a system band irrespective of the system bandwidth. Thus, a UE finds a Radio Frequency (RF) carrier 202 corresponding to the center frequency of the system band irrespective of system bandwidths, and performs a cell search for the SCH 204 in a 1.25 MHz band centered at the RF frequency 202, thereby acquiring initial synchronization for the system. After the cell search, the UE acquires system information by decoding the BCH 206 that is transmitted in the same 1.25 MHz band.

One important problem in a system supporting a scalable bandwidth is to design data and control channels in such a manner that a cell search for an SCH and BCH reception from neighboring cells can be facilitated even when a UE with a reception bandwidth smaller than a system bandwidth is serviced in a partial system band.

Various UEs capable of supporting different bandwidths may exist within a system supporting a scalable bandwidth. As an example, FIG. 3 conventionally illustrates how to allocate UEs 310, 312, 314, 316, 318, 320, each of which is in an active or idle mode and has a reception bandwidth of 10 MHz or 20 MHz, within a system band.

Referring to FIG. 3, when the UEs 310 to 320 accessible to a system have a minimum reception bandwidth of 10 MHz, Multimedia Broadcast Multicast Service (MBMS) physical channels, that is, MSMS#1 300 and MBMS#2 302, are transmitted in respective 10 MHz bands within the 20 MHz system band. The MBMS channels 300 and 302 are channels for providing many users with unidirectional services by using a broadcast or multicast scheme, various broadcast services are provided through the MBMS#1 300 and the MBMS#2 302. Also, an SCH 306 and a BCH 308 are transmitted in a band centered at an RF carrier frequency.

UE#3 314 that is in an idle mode and has a minimum reception bandwidth of 20 MHz can normally receive all of the MBMSs 300, 302, the SCH 306 and the BCH 308. UE#4 316 that is in an idle mode and receives no MBMS service needs to continually receive the SCH 306 and the BCH 308 from neighboring cells and perform a cell search and system information reception while being located in the middle 10 MHz band of the system band, so as to make preparations for a case where the UE#4 316 enters an active mode.

In contrast with this, each of UE#1 310 and UE#2 312 with reception capability corresponding to a bandwidth of 10 MHz receives the MBMS channel 300 or 302 in the upper or lower half band including a desired broadcast channel. However, since UE#1 310 and UE#2 312 are also in an idle mode, they need to receive not only MBMS data but also the SCH 306 and the BCH 308 from neighboring cells, as in the case of UE#4 316, so they can make preparations for entrance into an active mode. Nevertheless, UE#1 310 and UE#2 312 receive only partial bands of the SCH 306 and the BCH 308. It is possible to perform a cell search only by using a sequence of a partial band of the SCH 306, but it is difficult to normally decode system information without receiving all carrier symbols in a band constituting the BCH 308. Similar to this, UE#5 318 and UE#6 320 that are in active mode and located in the upper and lower half bands also have the same problem.

In order to normally decode the BCH 308, UE#1 310 and UE#2 312 must be operative to change their several reception RF frequencies to a band in which the BCH 308 is transmitted (a BCH transmission band), receive the BCH 308, and then return back to the half band in which the MBMSs 300 and 302 are transmitted. In such a case, however, there is a problem in that it may be difficult to receive MBMS data and perform a neighboring cell search without a hitch. Therefore, there is a need for an SCH and a BCH such that UEs can smoothly move between cells without changing their several reception RF frequencies.

SUMMARY OF THE INVENTION

Accordingly, the present invention substantially solves at least the above-mentioned problems occurring in the prior art, and provides a method and apparatus for facilitating a UE to receive system information of neighboring cells in a system supporting the scalabilities of a system bandwidth and a UE reception bandwidth.

Further, the present invention provides a method and apparatus for facilitating a UE to receive system information for neighboring cells even when receiving broadcast service data in an idle mode or being in an active mode.

In accordance with an aspect of the present invention, there is provided a method of transmitting a BCH in a cellular communication system supporting a scalable system bandwidth and employing multiple access technology, the method including generating first primary broadcast channel (P1-BCH) symbols including basic system information, and second primary broadcast channel (P2-BCH) symbols including core system information excluding the basic system information; mapping the P1-BCH symbols to a middle band centered at a center frequency of a system band and having a BCH transmission bandwidth; mapping the P2-BCH symbols to first and second transmission bands that have the BCH transmission bandwidth and locate within both bands adjoining the center frequency on both sides thereof and having a minimum reception bandwidth supportable by UEs within a cell respectively, when a bandwidth of the system band is at least two times of the minimum reception bandwidth; and transmitting the P1-BCH and P2-BCH symbols to the UEs within the cell through subcarriers of the bands to which the symbols are mapped.

In accordance with another aspect of the present invention, there is provided an apparatus for transmitting a BCH in a cellular communication system supporting a scalable system bandwidth and employing multiple access technology, the apparatus including a broadcast channel encoder for generating P1-BCH symbols including basic system information, and P2-BCH symbols including core system information excluding the basic system information; a subcarrier mapper for mapping the P1-BCH symbols to a middle band centered at a center frequency of a system band and having a BCH transmission bandwidth, and mapping the P2-BCH symbols to first and second transmission bands that have the BCH transmission bandwidth and locate within both bands adjoining the center frequency on both sides thereof and having a minimum reception bandwidth supportable by UEs within a cell respectively, when a bandwidth of the system band is at least two times of the minimum reception bandwidth; and a transmitter for transmitting the P1-BCH and P2-BCH symbols to the UEs within the cell through subcarriers of the bands to which the symbols are mapped.

In accordance with yet another aspect of the present invention, there is provided a method of receiving a BCH in a cellular communication system supporting a scalable system bandwidth and employing multiple access technology, the method including receiving P1-BCH symbols through a middle band centered at a center frequency of a system band and having a BCH transmission bandwidth; acquiring basic system information by decoding the P1-BCH symbols; receiving P2-BCH symbols through at least one of first and second transmission bands that have the BCH transmission bandwidth and locate within both bands adjoining the center frequency on both sides thereof and having a minimum reception bandwidth supportable by UEs within a cell respectively, when a bandwidth of the system band is at least two times of the minimum reception bandwidth; and acquiring core system information excluding the basic system information by decoding the P2-BCH symbols.

In accordance with still yet another aspect of the present invention, there is provided an apparatus for receiving a BCH in a cellular communication system supporting a scalable system bandwidth and employing multiple access technology, the apparatus including a Fast Fourier Transform (FFT) block for converting a received signal within a desired reception band into a plurality of subcarrier symbols; a subcarrier demapper for extracting P1-BCH symbols through a middle band centered at a center frequency of a system band and having a BCH transmission bandwidth, and extracting P2-BCH symbols through at least one of first and second transmission bands that have the BCH transmission bandwidth and locate within both bands adjoining the center frequency on both sides thereof and having a minimum reception bandwidth supportable by UEs within a cell respectively, when a bandwidth of the system band is at least two times of the minimum reception bandwidth; a first decoder for decoding the P1-BCH symbols to thereby acquire basic system information; and a second decoder for decoding the P2-BCH symbols to thereby acquire core system information excluding the basic system information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
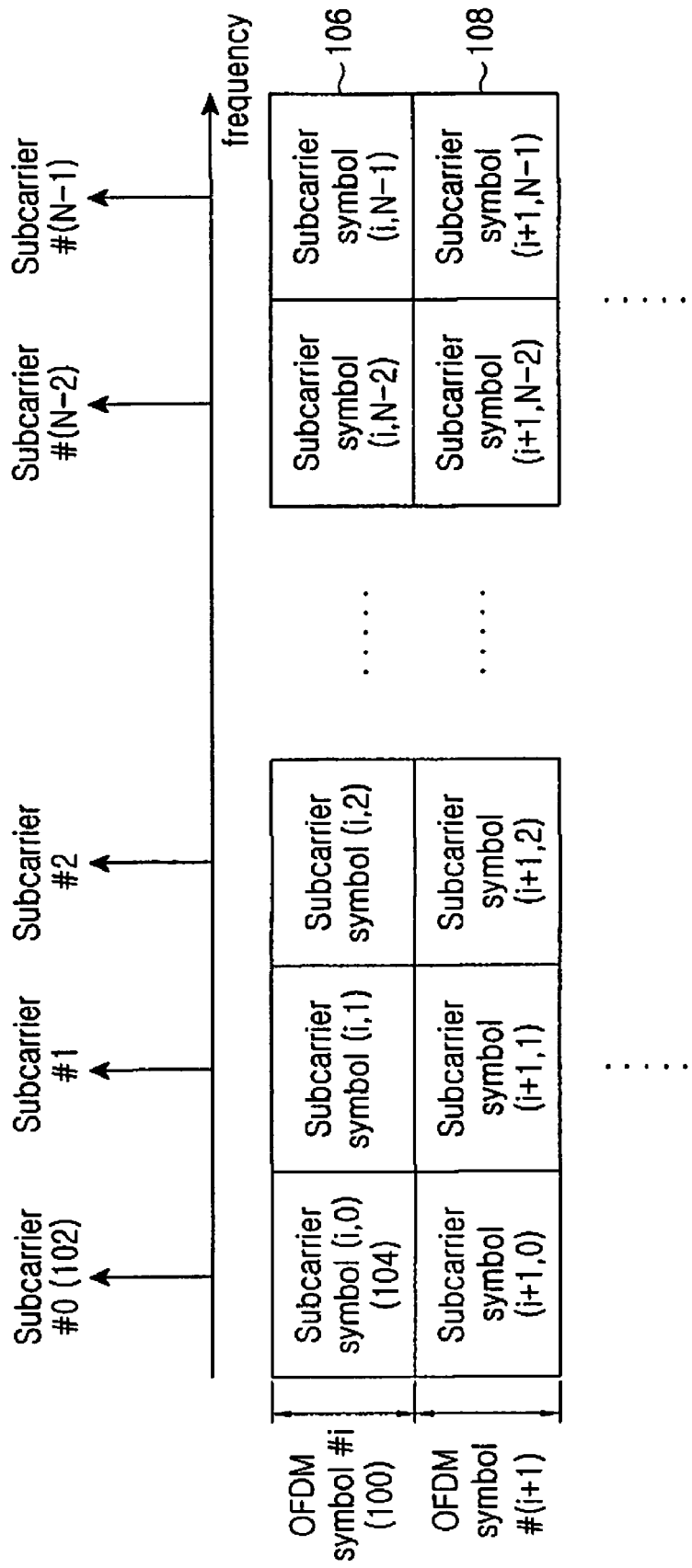
FIG. 1 is a view illustrating a conventional structure of an OFDM transmission signal in the time-frequency domain.
Figure 2:
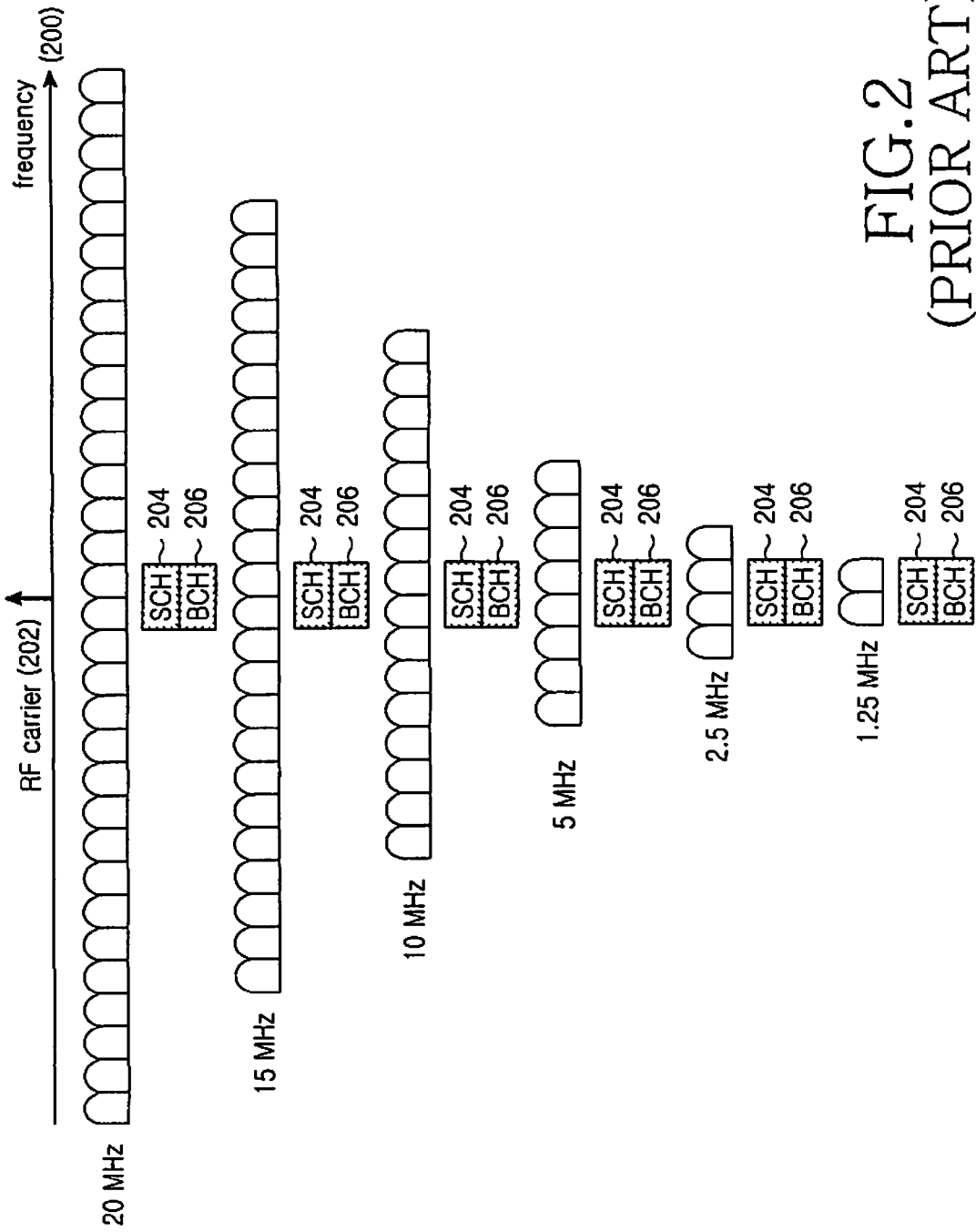
FIG. 2 is a conventional example of mapping frequency resources of an SCH and a BCH in a system supporting a scalable bandwidth.
Figure 3:
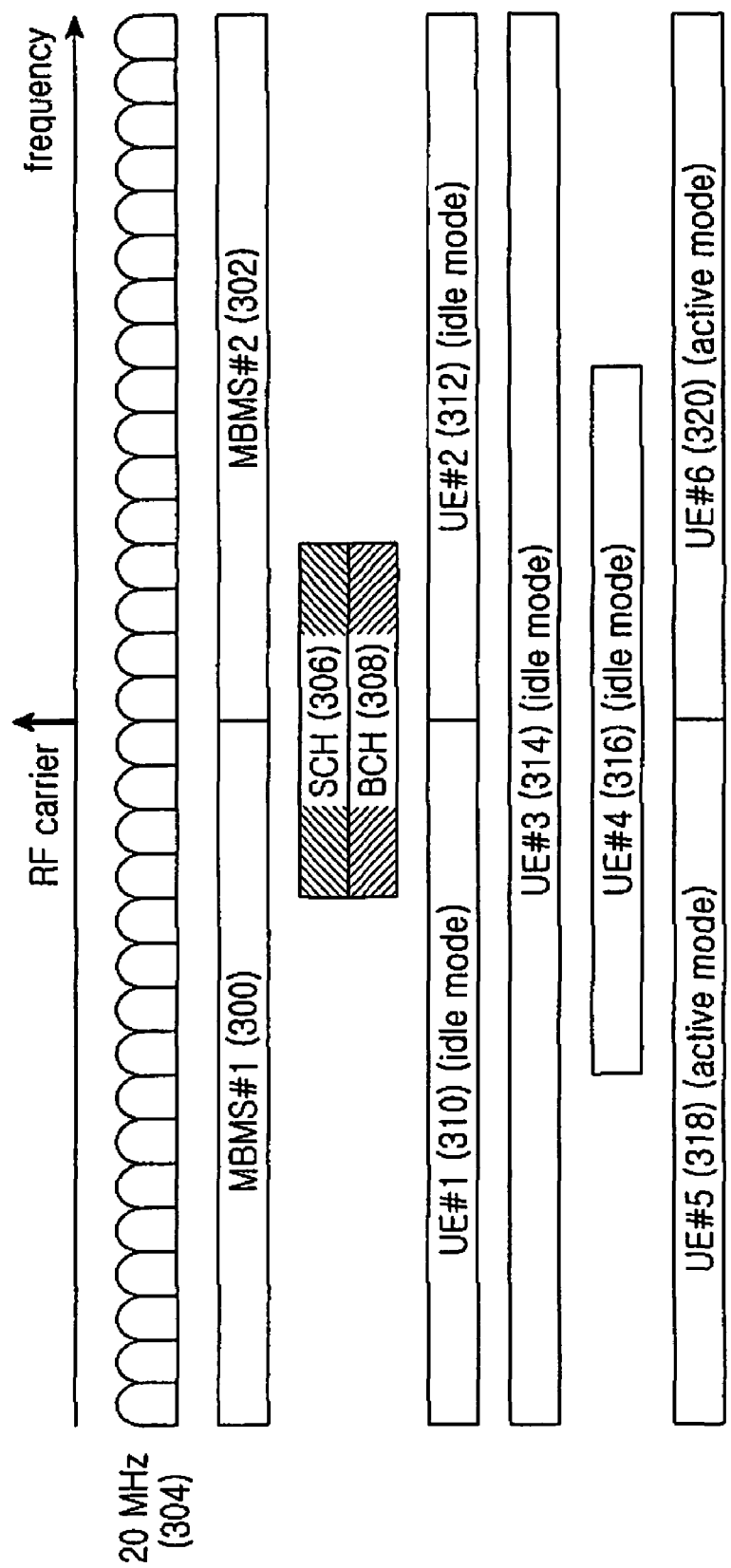
FIG. 3 is a view illustrating a conventional example how to allocate UEs, which have various reception bandwidths and are in an idle mode, within the overall system band.

Preferred embodiments of the present invention are described below with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted so as not to make the subject matter of the present invention rather unclear.

The present invention efficiently disposes a frequency band in which a common control channel, such as a synchronization channel (SCH) or a broadcast channel (BCH) is located, in a cellular communication system supporting a scalable bandwidth and employing multiple access technology.

The following description of preferred embodiments of the present invention target an Orthogonal Frequency Division Multiplexing (OFDM)-based cellular wireless communication system, but it will be apparent to those skilled in the art that the present invention may be slightly changed or modified so as to be applied to other communication systems having similar technical background and channel types without departing from the scope of the present invention.

Figure 4:
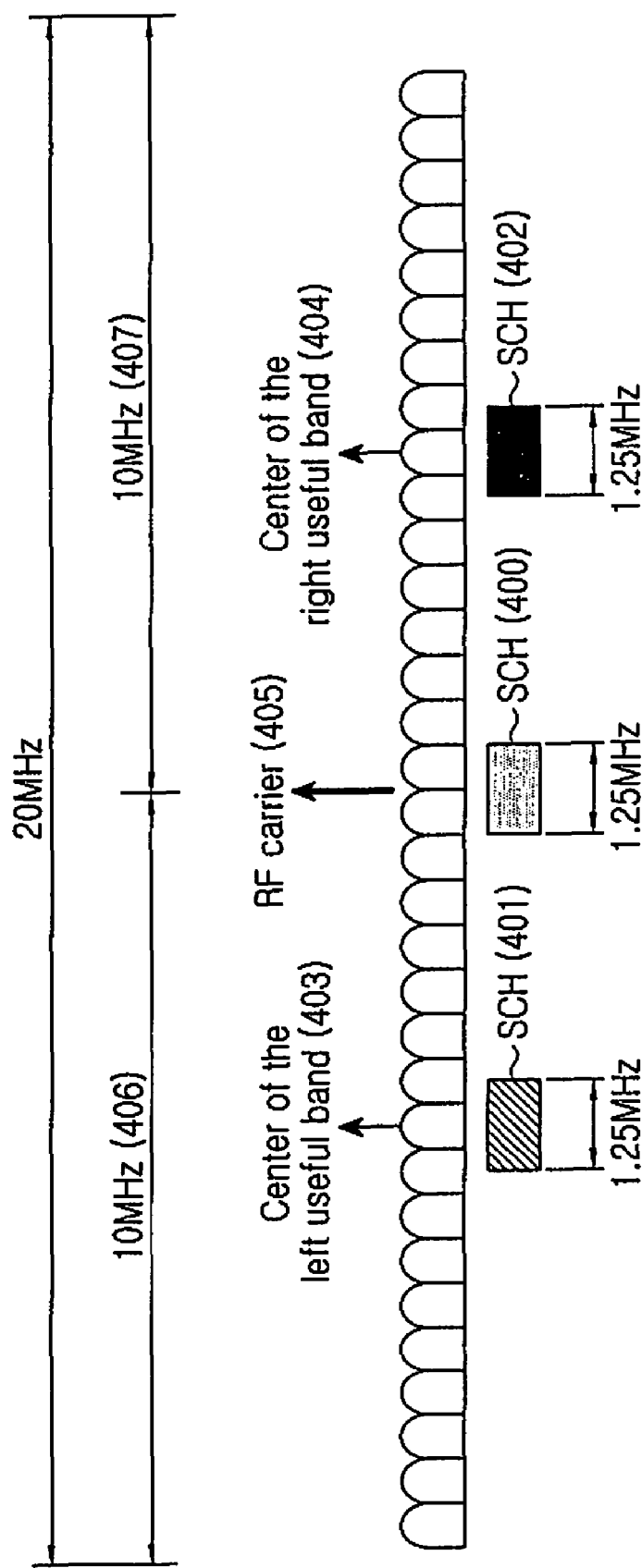
FIG. 4 is a view illustrating another example of mapping frequency resources of an SCH in a system supporting a scalable bandwidth according to the present invention.

FIG. 4 shows an example of mapping frequency resources of an SCH in a system supporting a scalable bandwidth according to the present invention. The SCH structure shown in FIG. 4 is a structure for facilitating UEs on the move between cells to perform a cell search for a current cell and neighboring cells when the UEs are permitted reception bandwidths of 10 MHz and 20 MHz in a system with a bandwidth of 20 MHz.

Referring to FIG. 4, SCHs 400, 401, 402 are transmitted with a bandwidth of 1.25 MHz in the center 405 of the overall system band and in the centers 403, 404 of useful bands within both 10 MHz bands, respectively. The useful band refers to a band in which useful subcarriers are located within each 10 MHz band. In general, since a partial band at either end of the overall system band is used as a guard band, the useful band is usually smaller than 10 MHz.

In FIG. 4, the SCH 400 is used by the UEs for performing an initial cell search, and the SCHs 401, 402 are mainly used by a UE with a reception bandwidth of 10 MHz for performing a cell search for neighboring cells when the UE is located in the left (i.e., lower) 10 MHz band 406 or the right (i.e., upper) 10 MHz band 407. In such an SCH structure, on whichever of the left and right 10 MHz bands 406, 407 and the middle band of the overall system band the UE with a reception bandwidth of 10 MHz camps, a cell search for neighboring cells can be easily performed because each SCH 400, 401, 402 is transmitted in the center of each band on which the UE camps.

In the present invention, a BCH structure enables a UE to normally receive and decode a common control channel from neighboring cells, in particular, a BCH, when the UE is not located in the center of a system band, as in the case where the UE is in an active mode or receives broadcast data in an idle mode. In particular, a BCH structure according to the present invention can be combined with the SCH structure presented in FIG. 4 while reducing BCH overhead, and allows UEs to easily acquire system information for a current cell and neighboring cells through a BCH in either case of an initial cell search or a neighboring cell search.

BCH conveying system information may be divided into a primary BCH (P-BCH) and a secondary BCH (S-BCH). The P-BCH and the S-BCH play different roles in such a manner that the P-BCH transmits system information that a UE rapidly reads when completing a cell search, and the S-BCH transmits system information that a UE need not rapidly read and system information that all UEs need not necessarily read.

One of the main features of the present invention is to divide the P-BCH into a P1-BCH and a P2-BCH according to a characteristic of system information included in the P-BCH, and to appropriately map the two P-BCHs (i.e., P1-BCH and P2-BCH) to frequency regions according to uses when an initial cell search and a cell search for neighboring cells are performed. The P1-BCH transmits physical configuration information, such as a system bandwidth, the number of transmit antennas, the length of a Cyclic Prefix (CP), etc., and small-sized basic system information that is needed immediately after a cell search. In contrast with this, the P2-BCH transmits other core system information that a UE must rapidly read on completing a cell search, excluding the information transmitted by the P1-BCH. System information to be transmitted over the P1-BCH and the P2-BCH by a system and a UE may be separately determined. In the present invention, the P1-BCH may include only information on a system bandwidth. The P2-BCH may also include scheduling information for the S-BCH.

Reference will now be made to examples of the present invention in conjunction with technology described herein. In the following specification, a description will be given, by way of example, based on the assumption that the minimum reception bandwidth granted to a UE within a system bandwidth is 10 MHz, and the transmission bandwidth of each BCH is 1.25 MHz irrespective of a system bandwidth. Further, frequency-domain mapping of a P-BCH in a system bandwidth will be described. However, it should be noted that the present invention is not limited to such specific numerical values.

Figure 5:
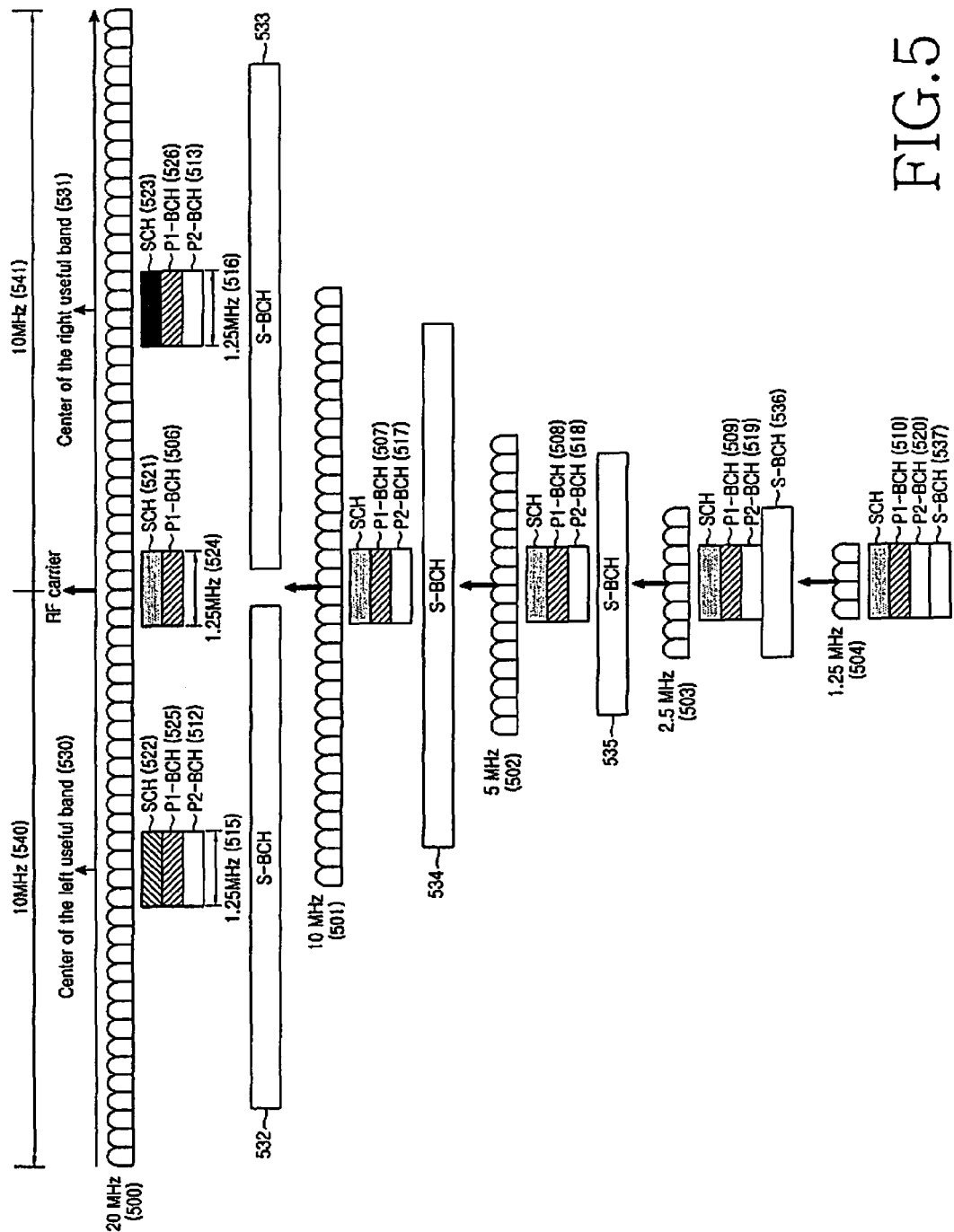
FIG. 5 is a view illustrating a frequency-domain mapping structure of a BCH in accordance with a first embodiment of the present invention.

FIG. 5 shows a first example of a BCH structure according to the present invention.

In FIG. 5, when a system bandwidth is smaller than 20 MHz, that is, in the case of system bands 501, 502, 503, 504, P1-BCH symbols (P1-BCH) 507, 508, 509, 510 and P2-BCH symbols (P2-BCH) 517, 518, 519, 520 are transmitted in the middle 1.25 MHz band of the system band, similar to an SCH sequence (SCH). The P1/P2-BCH symbols mean coded symbols of system information to be transmitted over a P1/P2-BCH, and the SCH sequence means a synchronization sequence transmitted over an SCH. However, when a system bandwidth is 20 MHz, that is, in the case of a system band 500, P1-BCHs 506, 525, 526 are transmitted in the middle 1.25 MHz band 524 of the system band, as well as in the middle 1.25 MHz bands of useful bands of both 10 MHz bands 540, 541, similar to SCHs 521, 522, 523. Also, P2-BCHs 512, 513 are transmitted in the middle 1.25 MHz bands 515, 516 of the useful bands of the respective 10 MHz bands 540 and 541.

Alternatively, the P1/P2-BCHs 525/512, 526/513 together with the SCHs 522, 523 may be transmitted in 1.25 MHz bands other than the middle 1.25 MHz bands of the useful bands. In this case, the location of a band where each of the P1/P2-BCHs 525/512, 526/513 is transmitted may be determined in advance by the selection of a system designer or a system standard. Although these channels will be described herein to be transmitted in the centers of both the 10 MHz bands, for the convenience of explanation merely, the scope of the present invention is not limited to this, and the present invention may also be applied to a case where a system bandwidth above 20 MHz is used.

When a system bandwidth is 20 MHz, that is, in a case of the system band 500, S-BCHs 532, 533 are transmitted in both the 10 MHz bands 540, 541 respectively. Also, when a system bandwidth is smaller than 20 MHz, that is, in a case of the system bands 501, 502, 503, 504, S-BCHs 534, 535, 536, 537 are transmitted in the center of the system band. The S-BCHs 532 to 537 may be transmitted over a wide band, as shown in FIG. 5, or may be transmitted using data channel resources including consecutive subcarriers, and the present invention places no limitation on a way to transmit the S-BCHs.

As already mentioned above, since the P1-BCHs include only physical configuration information and basic system information used immediately after a cell search, their amount of information is not so large, and thus there is little problem of overhead even when the three P1-BCHs 506, 525, 526 are transmitted together with the SCHs 521, 522, 523 within the system band. In addition, since the P1-BCHs 506 to 510, 525, 526 must be received prior to the acquisition of information on a system bandwidth when a UE performs an initial cell search, they have the same physical channel structure no matter what a system bandwidth is. That is, the same channel coding is applied to the P1-BCHs 506 to 510, 525, 526 irrespective of a system bandwidth, and particularly the P1-BCHs 506 to 510 are transmitted using the same subcarriers.

On the contrary, since the P2-BCHs 512, 513 include core system information, such as scheduling information for secondary system information carried by the S-BCHs 532, 533, a Public Land Mobile Network (PLMN) ID, mobility-related PLMN/cell selection information, etc., their amount of information is not negligible, and thus they are transmitted only in both the 10 MHz bands 540, 541. Also, since the P2-BCHs 512, 513 are received after a UE acquires system bandwidth information through the P1-BCH 506, channel coding, subcarrier mapping, a transmission bandwidth and so forth may vary according to system bandwidths.

The channel structure in FIG. 5 is characterized in that when a system bandwidth is 20 MHz, that is, in the case of the system band 500, a channel structure within each of both the 10 MHz bands 540, 541 is the same as that of the system band 501 with a system bandwidth of 10 MHz. Thus, for the system band 500 with a system bandwidth of 20 MHz and the system band 501 with a system bandwidth of 10 MHz, a UE with a reception bandwidth of 10 MHz can perform a neighboring cell search and a system information acquisition operation in the same manner.

Figure 6:
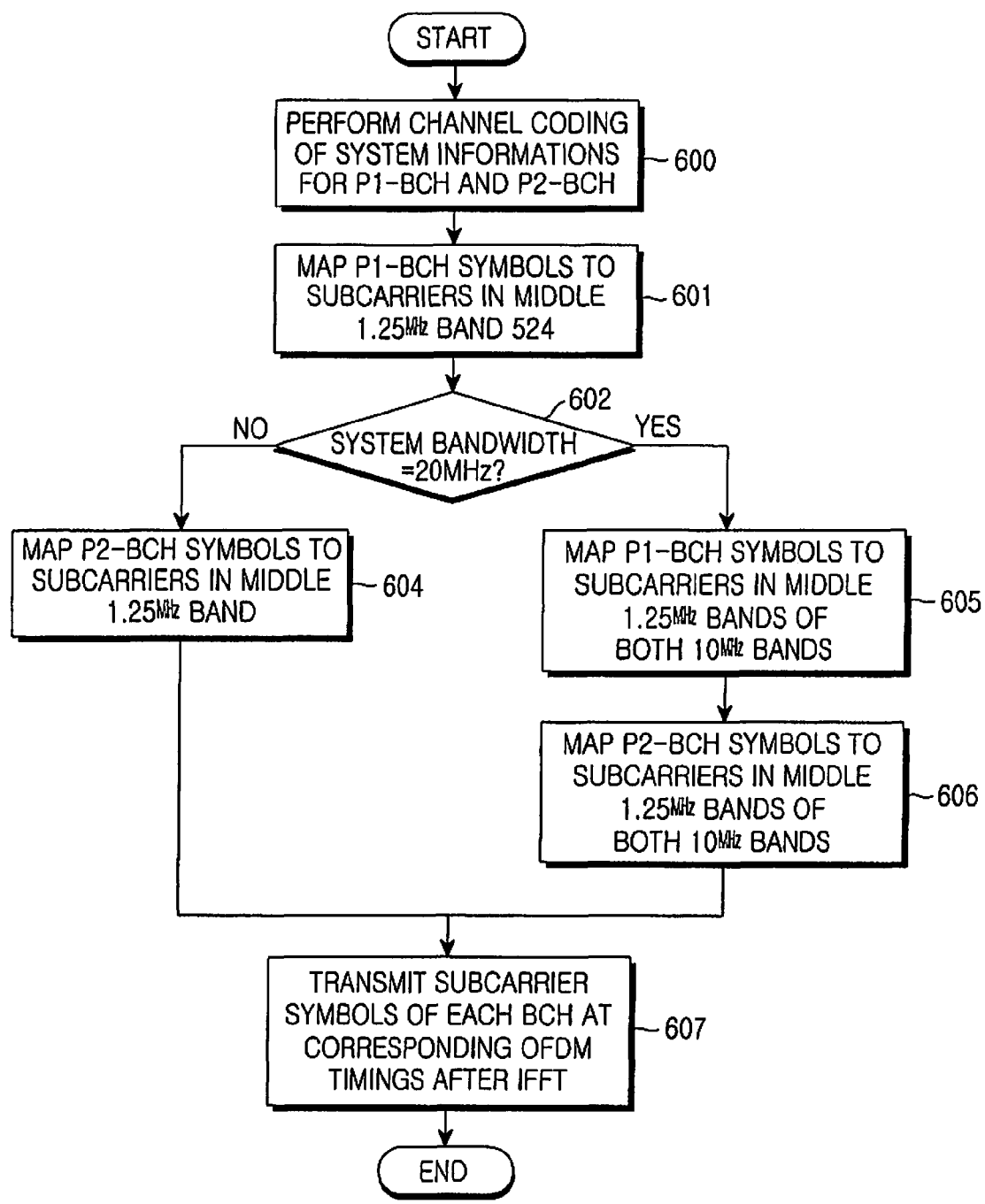
FIG. 6 is a flowchart illustrating an operational procedure of a base station transmitter in accordance with the first embodiment of the present invention.

FIG. 6 shows an example of an operational procedure of a base station transmitter according to the present invention.

In FIG. 6, the base station transmitter generates P1-BCH symbols and P2-BCH symbols by performing channel coding for system informations to be transmitted over P1-BCHs and P2-BCHs respectively in step 600. The P1-BCH symbols generated in step 600 are mapped to subcarriers belonging to the middle 1.25 MHz band 524 of a system band, irrespective of whether or not a system bandwidth is 20 MHz in step 601. Subsequently, the base station transmitter determines whether the system bandwidth of a current cell, with which the system information will be transmitted, is 20 MHz in step 602. On one hand, when the system bandwidth is smaller than 20 MHz, the P2-BCH symbols are mapped to subcarriers belonging to the middle 1.25 MHz band of the system band in step 604.

On the other hand, when the system bandwidth is 20 MHz. The P1-BCH symbols are mapped to subcarriers belonging to the middle 1.25 MHz bands 515, 516 of both 10 MHz bands in step 605, and the P2-BCH symbols are also mapped to subcarriers belonging to the middle 1.25 MHz bands 515, 516 of both the 10-MHz wide bands in step 606. The P2-BCH symbols transmitted in the left 10-MHz wide band may be the same as or different from those transmitted in the right 10 MHz band. This is because core system information and S-BCH scheduling information for the left 10 MHz band may be different from those for the right 10 MHz band. The BCH symbols mapped to the subcarriers in steps 601, 604, 605, 606 go through Inverse Fast Fourier Transform (IFFT), and are transmitted at corresponding OFDM symbol timings in step 607.

Figure 7:
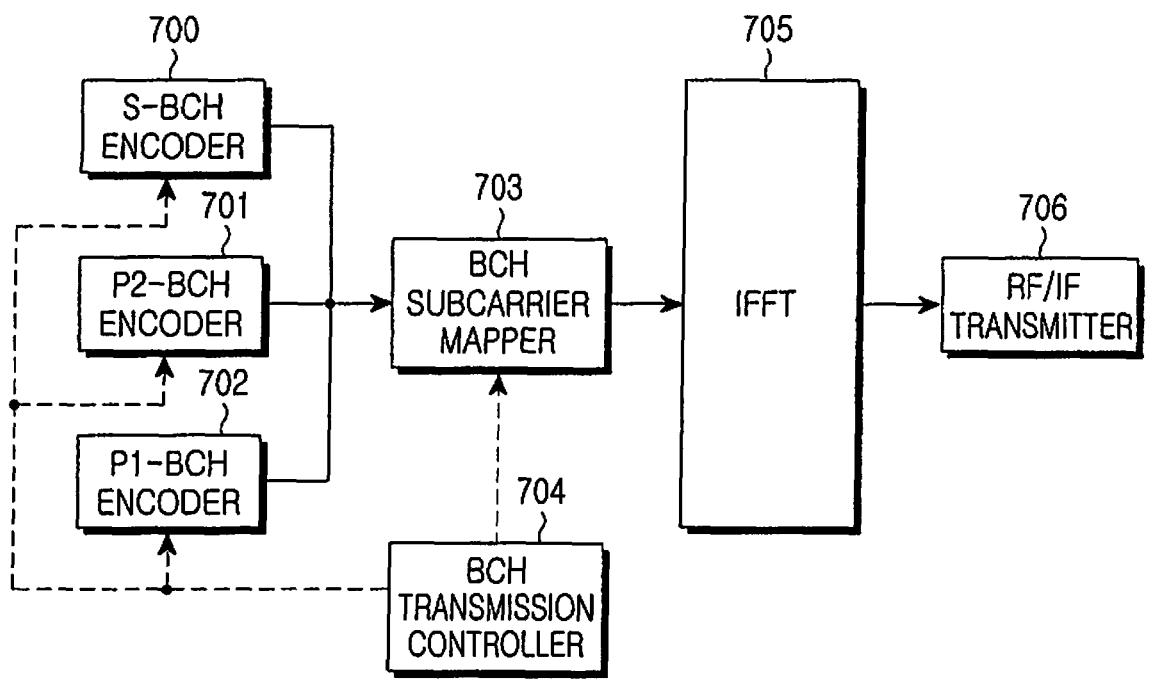
FIG. 7 is a block diagram of a base station transmitter in accordance with the first embodiment of the present invention.

FIG. 7 shows a base station transmitter according to the present invention.

In FIG. 7, BCH encoders 700, 701, 702 generate S-BCH symbols, P2-BCH symbols and P1-BCH symbols by performing channel coding for system information to be transmitted over S-BCHs, P2-BCHs and P1-BCHs respectively. The BCH symbols are mapped to subcarriers of corresponding BCH bands by means of a BCH subcarrier mapper 703, and then converted into a time-domain OFDM signal via an IFFT block 705. The OFDM signal is converted into an RF signal in a corresponding system band and then transmitted by means of a Radio Frequency/Intermediate Frequency (RF/IF) transmitter 706.

With regard to this, when a system bandwidth is 20 MHz, the S-BCH symbols and the P2-BCH symbols are mapped to IFFT input tabs corresponding to the middle 1.25 MHz bands 515, 516 of both 10 MHz bands 540, 541, and the P1-BCH symbols are mapped to IFFT input tabs corresponding to the middle 1.25 MHz band of a system band 500, as well as the middle 1.25 MHz bands of both the 10 MHz bands. The three P1-BCHs 506, 525, 526 may include the same system information or different system information, and their respective timings may vary according to the types of system information to be transmitted over the P1-BCHs. Such a mapping operation is controlled by a BCH transmission controller 704. That is, the BCH transmission controller 704 provides the corresponding BCH encoders 700, 701, 702 with system information to be transmitted over the corresponding BCHs, and controls the BCH subcarrier mapper 703 by determining mapping locations of the BCH symbols according to system bandwidths.

Figure 8:
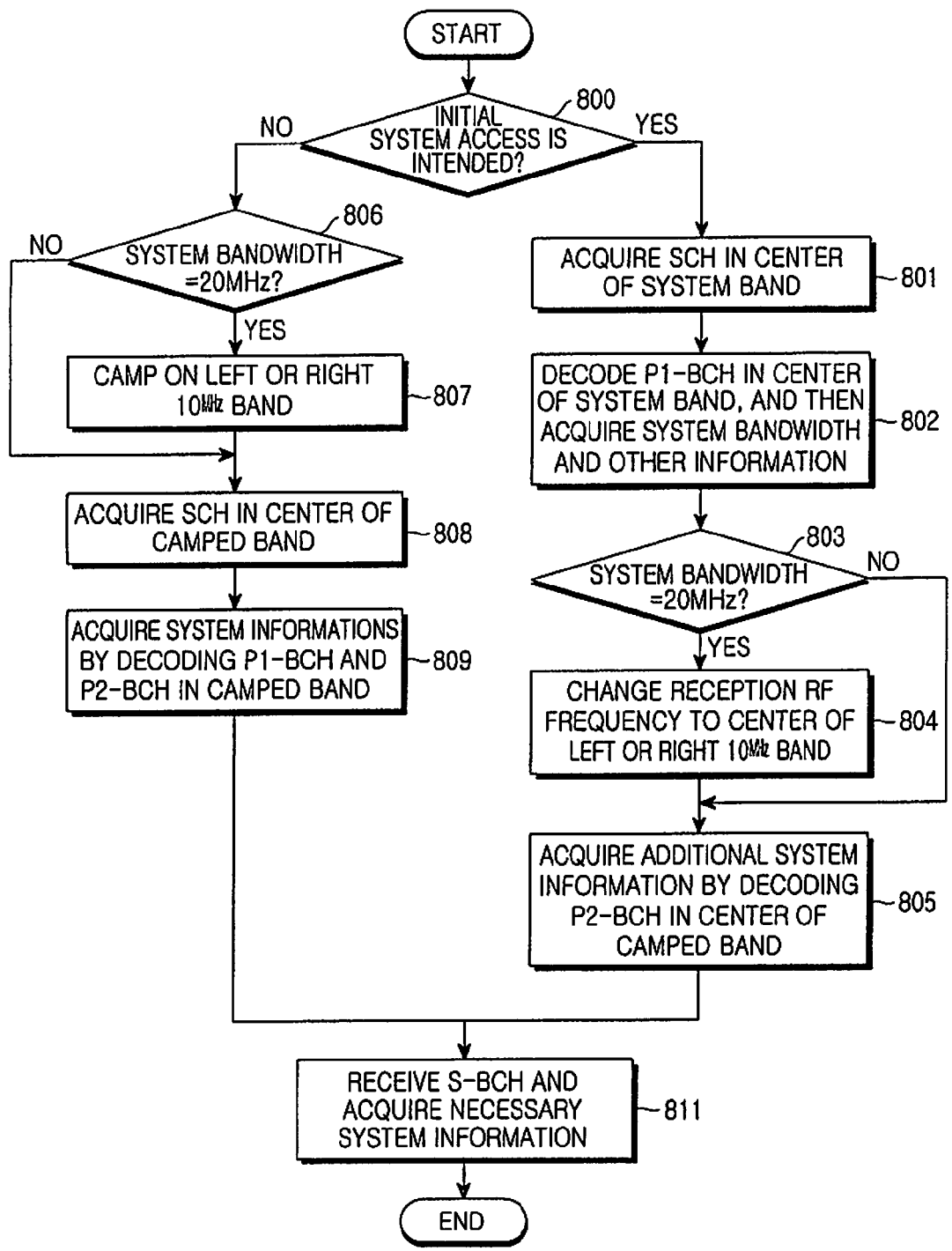
FIG. 8 is a flowchart illustrating a reception procedure of a UE with a reception bandwidth of 10 MHz in accordance with the first embodiment of the present invention.

FIG. 8 shows a reception procedure of a UE with a reception bandwidth of 10 MHz according to the first example of the present invention.

In FIG. 8, the UE determines whether to perform initial system access in step 800, and proceeds to step 806 when the UE is to perform the initial system access. An example of performing the initial system access includes the power-on of the UE.

When the UE is to perform the initial system access, the UE is not aware of system information for a target system, including a system bandwidth. Thus, the UE performs a cell search to thereby acquire downlink synchronization from an SCH transmitted in the middle 1.25 MHz band of a 10 MHz band on which the UE camps in step 801. The UE then acquires system bandwidth information and basic system information for the target system by receiving a P1-BCH in the same middle 1.25 MHz band as that for the SCH in step 802, and checks a system bandwidth according to the system bandwidth information in step 803. When the checked system bandwidth is 20 MHz, the UE changes a reception RF frequency to the center 530 or 531 of the left or right 10 MHz band 540 or 541 in step 804, and then proceeds to step 805. The UE arbitrarily determines to which of both the 10 MHz bands 540, 541 the UE moves, or checks loading status information, which indicates the number of accessing UEs within each 10 MHz band, from the basic system information of the P1-BCH, and then determines to which 10 MHz band the UE moves, based on the checked loading information.

However, when the checked system bandwidth is not 20 MHz, the UE need not change a reception RF frequency because it can receive the overall system band. Thus, the UE acquires system information transmitted over a P2-BCH by receiving the P2-BCH in the middle 1.25 MHz band of a 10 MHz band on which the UE currently camps and decoding the received P2-BCH in step 805. If necessary, the UE acquires additional secondary system information through an S-BCH in step 811. If the P2-BCH includes scheduling information for the system information transmitted over the S-BCH in the aforementioned steps, the UE acquires the scheduling information for the S-BCH in step 805, and can acquire desired system information from among the system information transmitted over the S-BCH at timings and subcarriers indicated by the scheduling information.

In addition, when the UE accessing a corresponding system is to perform a neighboring cell search and system information acquisition or is to acquire system information added or changed for a current cell, the UE checks whether a system bandwidth of the current cell is 20 MHz in step 806. If the checked system bandwidth is 20 MHz, the UE changes a reception RF frequency to the center 540 or 541 of the left or right 10 MHz band 540 or 541 in order to camp on the corresponding 10 MHz band in step 807. This is for normally receiving a P2-BCH in the camped band 540 or 541. When the checked system bandwidth is not 20 MHz, the UE proceeds to step 808 while maintaining a current reception RF frequency.

When it is necessary to synchronize with a neighboring cell for which the UE is to acquire system information, the UE acquires downlink synchronization for the neighboring cell from an SCH transmitted in the middle 1.25 MHz band of the camped band in step 808. The UE then receives a P1-BCH and a P2-BCH within the middle 1.25 MHz band of the camped band, and decodes the received BCHs, thereby acquiring system informations and physical configuration information from the BCHs in step 809. Similar to the case of the initial system access, the UE receives and acquires secondary system information used in the neighboring cell through an S-BCH, if necessary in step 811.

Figure 9:
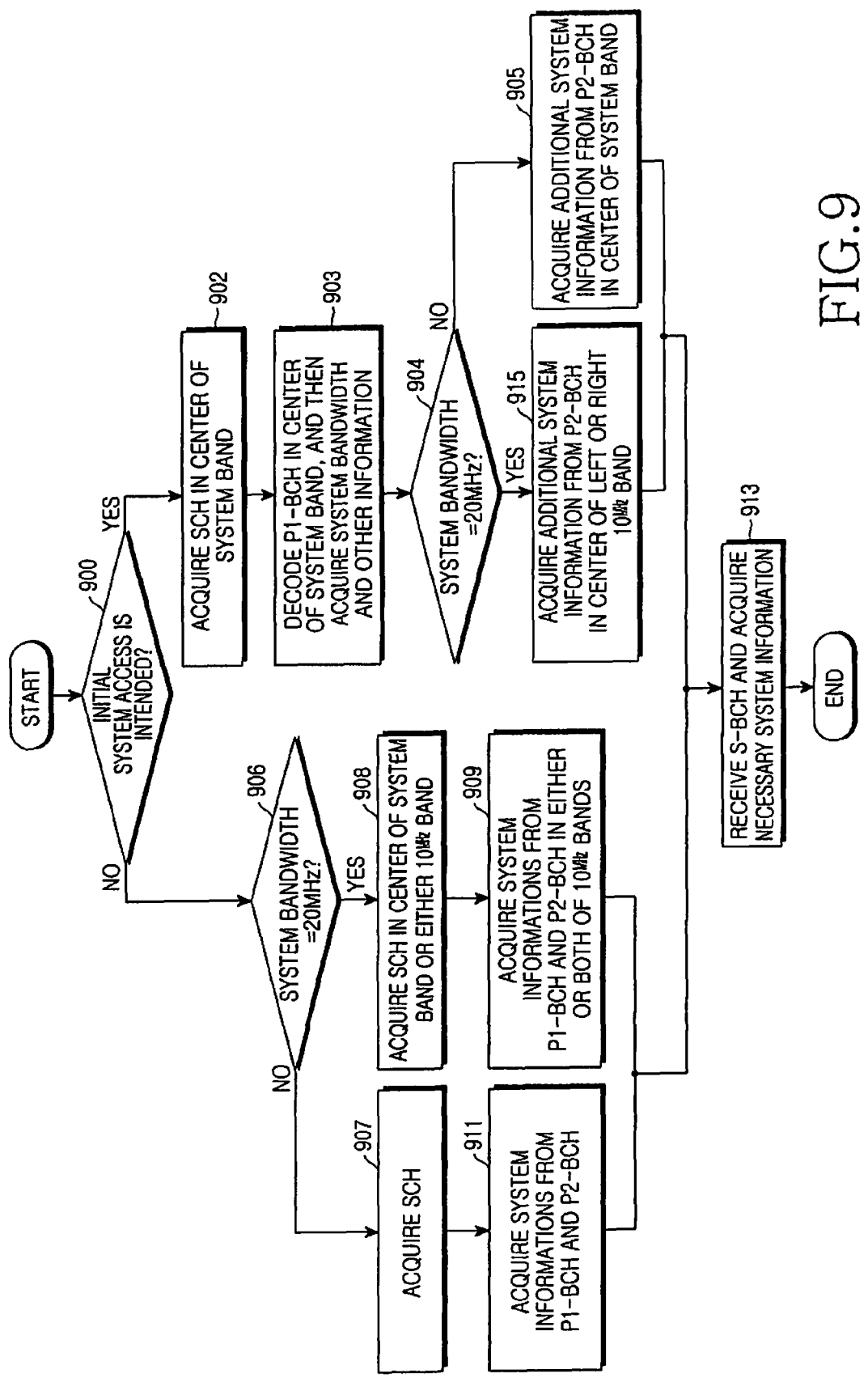
FIG. 9 is a flowchart illustrating a reception procedure of a UE with a reception bandwidth of 20 MHz in accordance with the first embodiment of the present invention.

FIG. 9 shows an example of a reception procedure of a UE with a reception bandwidth of 20 MHz according to the first example of the present invention. In the case of such a UE, the UE need not camp on either 10 MHz band because the UE can receive the overall system band even in a system with a system bandwidth of 20 MHz. Also, the UE can receive all of SCHs, P1-BCHs and P2-BCHs transmitted in both 10 MHz bands.

Referring to FIG. 9, the UE determines whether to perform initial system access in step 900. When the UE is to perform the initial system access, the UE acquires downlink synchronization from an SCH transmitted in the middle 1.25 MHz band of a system band in step 902, acquires system bandwidth information and basic system information by receiving a P1-BCH in the same middle 1.25 MHz band as that for the SCH in step 903, and then checks a system bandwidth according to the system bandwidth information in step 904.

When the checked system bandwidth is 20 MHz, the UE acquires core system information from a P2-BCH transmitted in the middle 1.25 MHz band of the left or right 10 MHz band in step 915. When the checked system bandwidth is not 20 MHz, the UE acquires core system information from a P2-BCH transmitted in the middle 1.25 MHz band of the system band in step 905. If necessary, the UE receives and acquires secondary system information carried by an S-BCH in step 913.

In addition, when the UE accessing a corresponding system is to perform a neighboring cell search and system information acquisition or is to acquire system information added or changed for a current cell, the UE checks if a system bandwidth of the current cell is 20 MHz in step 906. If the checked system bandwidth is smaller than 20 MHz, the UE acquires downlink synchronization by receiving an SCH in the middle 1.25 MHz band of a system band in step 907, acquires system informations by receiving a P1-BCH and a P2-BCH in step 911, and then proceeds to step 913 so as to acquire secondary system information, if necessary.

If the checked system bandwidth is 20 MHz, the UE acquires downlink synchronization from an SCH transmitted in the middle 1.25 MHz band of a system band or either 10 MHz band in step 908. The UE also acquires system information by receiving a P1-BCH and a P2-BCH transmitted in the middle 1.25 MHz band of either 10 MHz band or receiving all of P1-BCHs and P2-BCHs transmitted in the middle 1.25 MHz bands of both 10 MHz bands in step 909, and then proceeds to step 913 to acquire secondary system information, if necessary.

Figure 10:
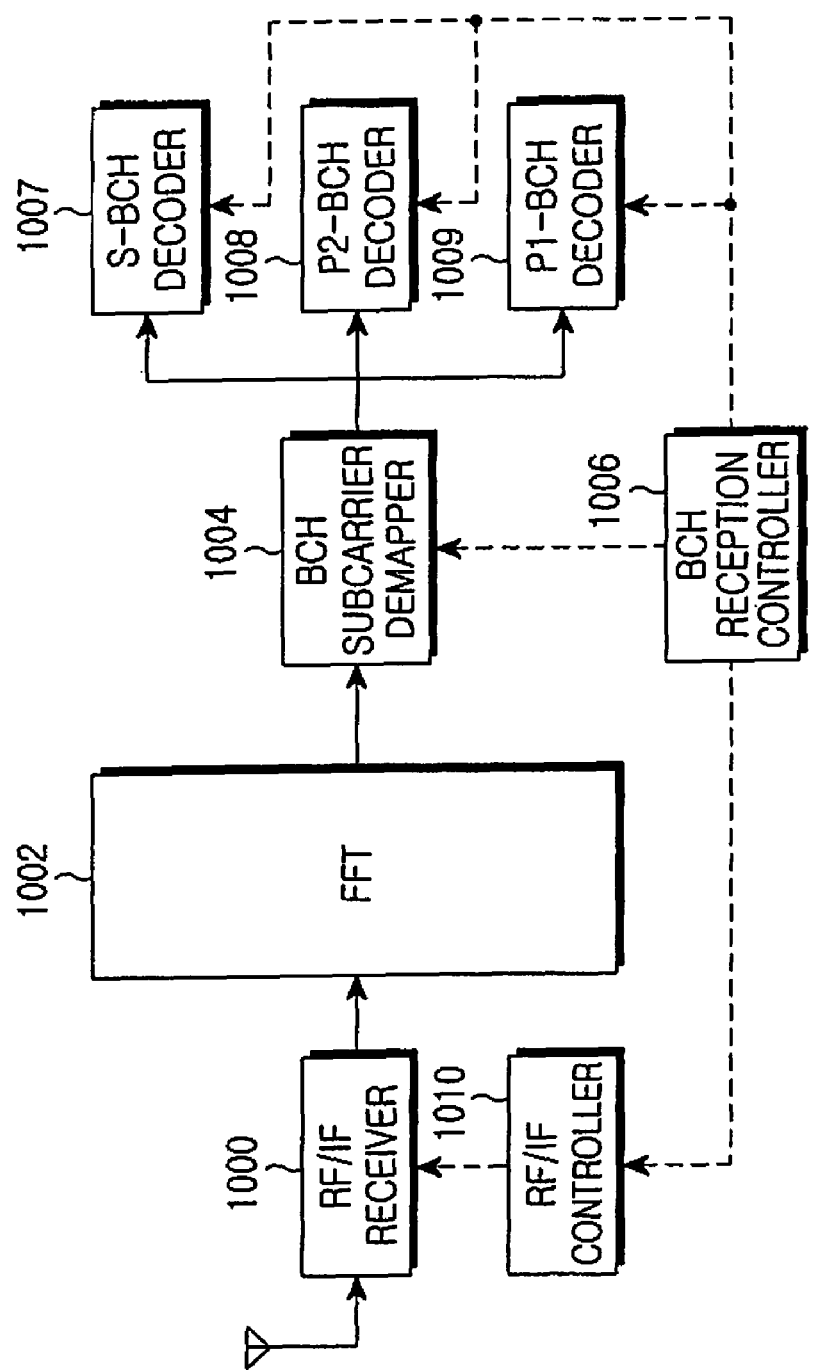
FIG. 10 is a block diagram of a receiver in a UE in accordance with the first embodiment of the present invention.

FIG. 10 shows an example of a UE for receiving and decoding a BCH according to the present invention.

In FIG. 10, the UE adjusts the reception RF frequency of an RF/IF receiver 1000 by means of an RF/IF controller 1010, thereby receiving an RF signal in a desired reception band. The RF signal is converted into subcarrier symbols via an FFT block 1002, and a BCH subcarrier demapper 1004 divides the subcarrier symbols into P1-BCH symbols, P2-BCH symbols and S-BCH symbols according to a channel mapping structure in the reception band and outputs the respective divided BCH symbols to BCH decoders 1007, 1008 and 1009.

A BCH reception controller 1006 controls a reception band and a reception RF frequency according to a system bandwidth and timings of the BCHs by means of the RF/IF controller 1010, thereby allowing the BCH symbols to be received within a band on which the UE camps. A band on which the UE will camp after initial synchronization acquisition may be determined by making reference to system bandwidth information acquired through the P1-BCH and loading status information for each 10 MHz band, which can be additionally transmitted when a system bandwidth is 20 MHz. Also, the BCH reception controller 1006 controls the BCH subcarrier demapper 1004 to appropriately input the BCH symbols to an S-BCH decoder 1007, a P2-BCH decoder 1008 and a P1-BCH decoder 1009, and controls the BCH decoders 1007, 1008, 1009 to decode the BCH symbols in a manner corresponding to channel coding formats applied to relevant channels. The BCH decoders 1007, 1008 and 1009 decode the BCH symbols to thereby acquire system information carried by the BCHs.

Figure 11:
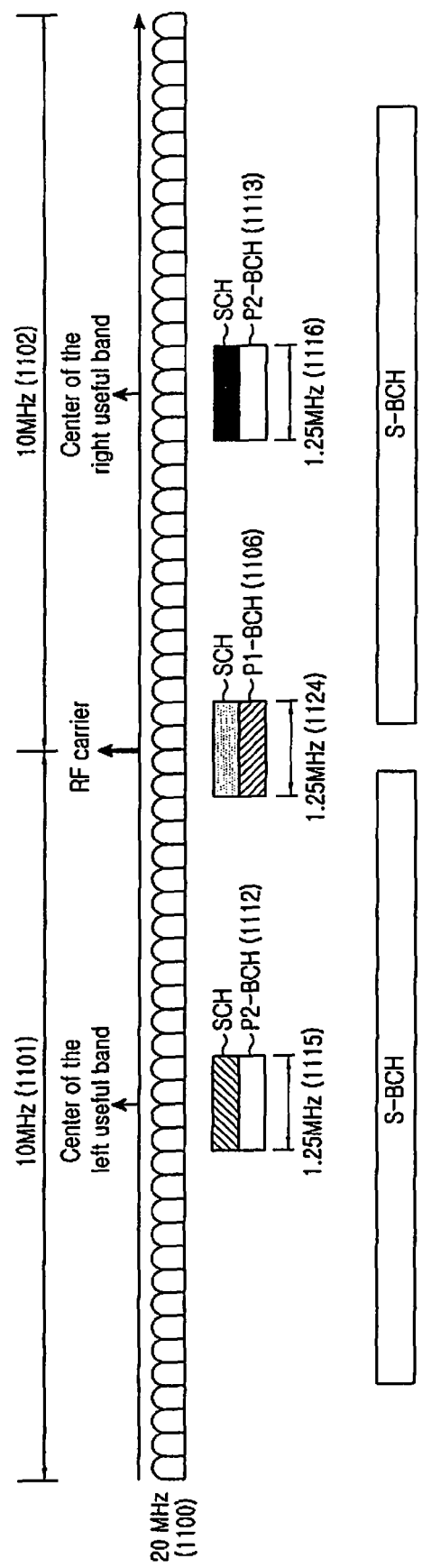
FIG. 11 is a view illustrating a frequency-domain mapping structure of a BCH in accordance with a second embodiment of the present invention.

FIG. 11 shows a second example of a BCH structure according to the present invention. Channel mapping structures for system bandwidths smaller than 20 MHz are not illustrated in the drawing because they are the same as those in the BCH structure of the first example shown in FIG. 5.

In FIG. 11, when a system bandwidth is 20 MHz, that is, in the case of a system band 1100, a P1-BCH 1106 is transmitted in the middle 1.25 MHz band of the system band, as in the structure of FIG. 5, but is not transmitted in the middle 1.25 MHz bands 1115 and 1116 of both 10 MHz bands 1101 and 1102. Also, similar to the first example, P2-BCHs 1112 and 1113 are transmitted in the middle 1.25 MHz bands 1115 and 1116 of both the 10 MHz bands 1101 and 1102. SCHs and S-BCHs are transmitted in the same manner as in the first example.

The channel mapping structure of FIG. 11 can reduce overhead by transmitting the P1-BCH 1106 only once within the overall system band. However, since the P1-BCH 1106 is not transmitted in each 10 MHz band 1101 and 1102, basic system information for a neighboring cell, which the P1-BCH is used to transmit, may be provided through other channels, such as high layer signaling of a base station on which a UE currently camps or an S-BCH. Alternatively, a UE with a reception bandwidth of 10 MHz may temporarily shift a reception RF frequency to the center of a system band to thereby receive the P1-BCH 1106, and then return back to a 10 MHz band on which the UE has originally camped. Thus, in steps 809 and 909 according to the first example, in FIGS. 8 and 9, the UE acquires basic system information from a base station, on which the UE currently camps, through an upper layer signaling control message, instead of acquiring the basic system information through the P1-BCH from a neighboring cell.

Figure 12:
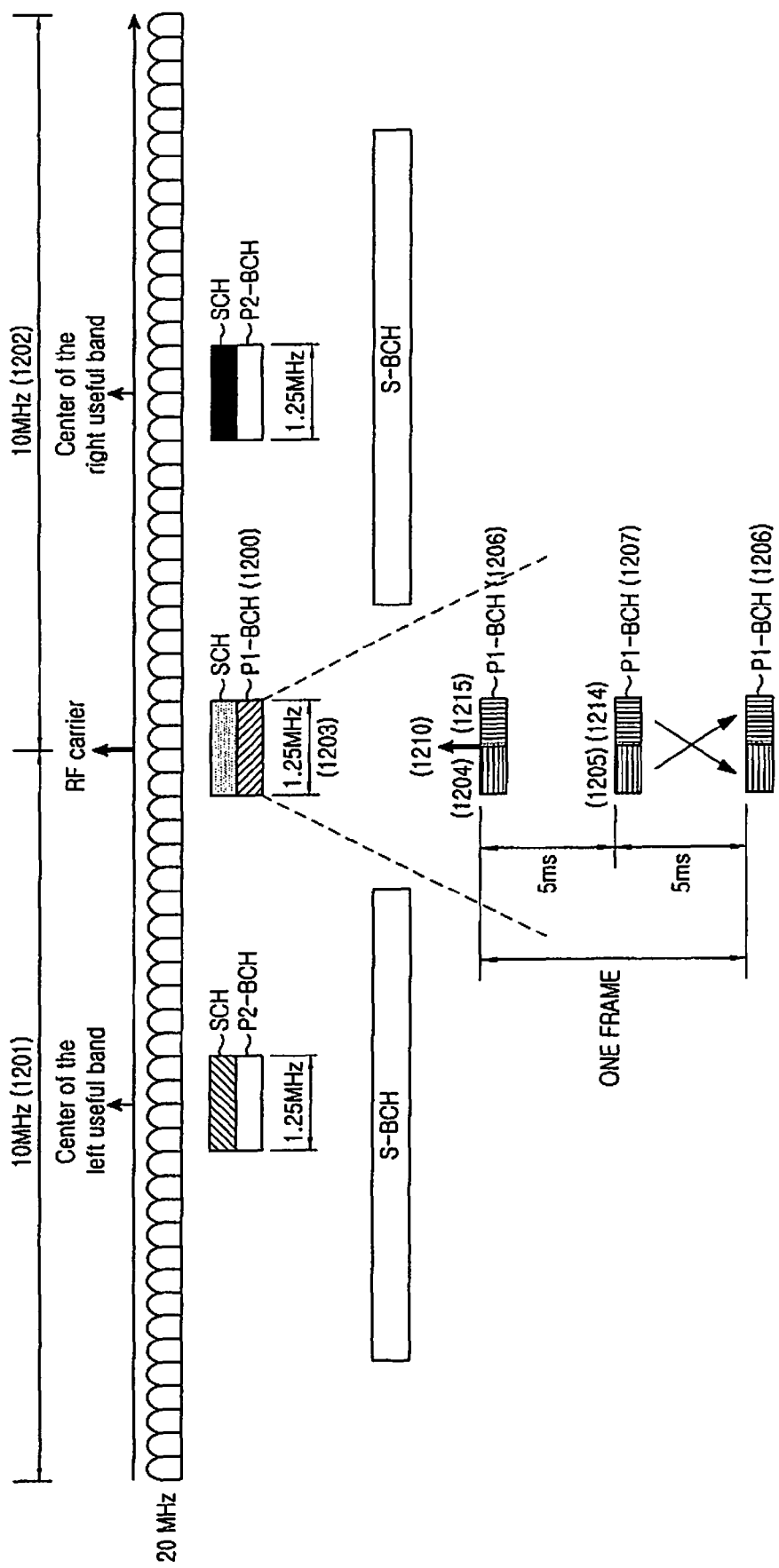
FIG. 12 is a view illustrating a frequency-domain mapping structure of a BCH in accordance with a third embodiment of the present invention.

FIG. 12 shows a third example of a BCH structure according to the present invention. This BCH structure is similar to that of FIG. 11, but two P1-BCHs 1206, 1207 are transmitted in different time intervals within a 10 ms frame so a UE with a reception bandwidth of 10 MHz can receive a P1-BCH 1200 from a neighboring cell in the middle 1.25 MHz band 1203 of a system band even when the UE performs a neighboring cell search and system information acquisition.

The P1-BCH 1206 transmitted in a first time interval at the center frequency 1210 of the system band includes two symbol blocks 1204 and 1215, and the P1-BCH 1207 transmitted in a second time interval includes two symbol blocks 1205 and 1214 corresponding to the transposed symbol blocks 1204 and 1215. For example, when the UE with a reception bandwidth of 10 MHz camps on the left (i.e., lower) 10 MHz band 1201, the UE can acquire all symbols necessary for decoding the P1-BCH 1200 by receiving the symbols blocks 1204 and 1205, which are transmitted at the upper end of the left 10 MHz band 1201, at intervals of 5 ms within a 10 ms frame. When the UE camps on the right (i.e., upper) 10 MHz band, the UE can also acquire basic system information for a neighboring cell by receiving the symbol blocks 1215 and 1214 transmitted at the lower end of the right 10 MHz band 1202. Of course, the symbols blocks of the P1-BCH may be alternately and repeatedly transmitted in cycles other than 5 ms, and such cycles may be set in advance.

Figure 13:
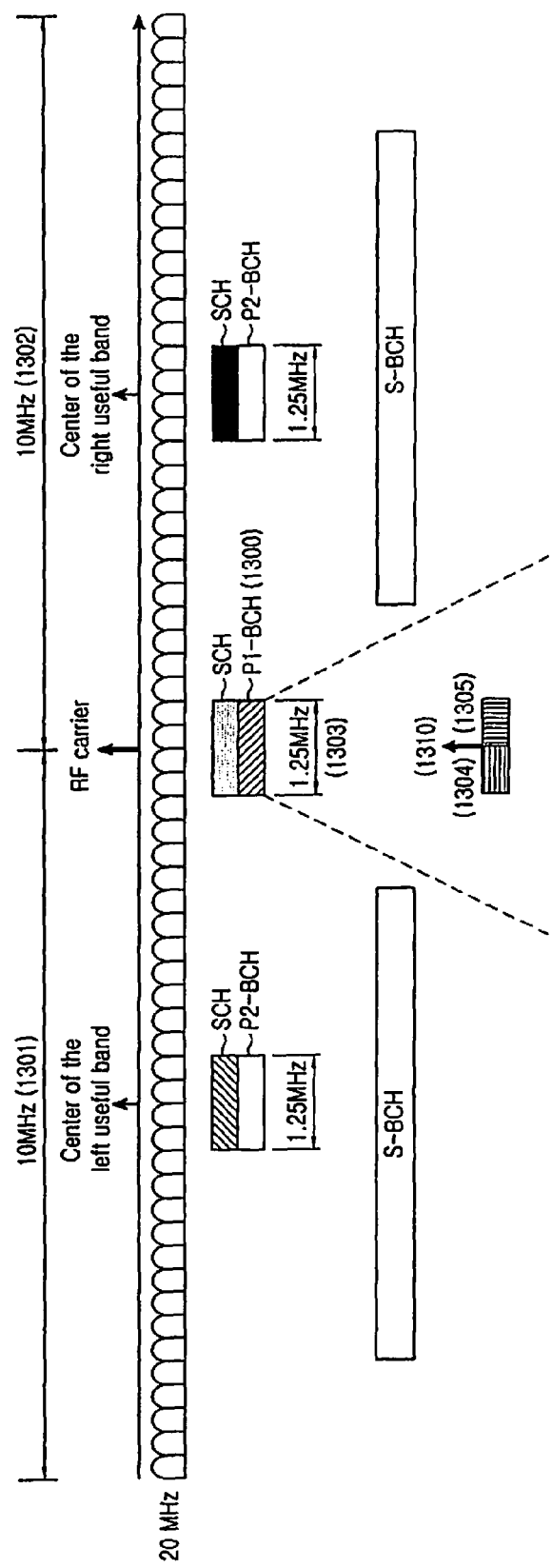
FIG. 13 is a view illustrating another frequency-domain mapping structure of a BCH in accordance with the third embodiment of the present invention

FIG. 13 shows another BCH mapping structure according to the third example of the present invention.

In FIG. 13, a P1-BCH 1300 is transmitted in the middle 1.25 MHz band of a system band, and includes two identical symbol blocks 1304 and 1305 that are repeatedly transmitted in both 0.675 MHz bands with respect to the center frequency of the system band. In this way, when a UE with a reception bandwidth of 10 MHz camps on either 10 MHz band 1301 or 1302, the UE can decode the P1-BCH 1300 only by any one of the symbols blocks 1304 and 1305.

Under the aforementioned BCH structure according to the third example, as shown in FIGS. 12 and 13, when the UE with a reception bandwidth of 10 MHz camps on either 10 MHz band of the 20 MHz system band, the UE can use the P1-BCHs 1200 and 1300 for a neighboring cell search and system information acquisition.

As described above, the present invention enables a UE with a reception bandwidth smaller than a system bandwidth to be rapidly connected to a target cell by easily detecting BCHs from neighboring cells even when the UE receives broadcast data in an idle mode or is in an active mode in a cellular wireless communication system supporting a scalable bandwidth. In particular, even when BCH resource mapping varies according to system bandwidths, the UE need not know a system bandwidth in advance in the process of a cell search, and operations can be implemented with lower BCH resource overhead.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting a broadcast channel (BCH) in a cellular communication system supporting a scalable system bandwidth and employing multiple access technology, the method comprising the steps of:

generating first primary broadcast channel (P1-BCH) symbols including basic system information, and second primary broadcast channel (P2-BCH) symbols including core system information excluding the basic system information;

mapping the P1-BCH symbols to a middle band centered at a center frequency of a system band and having a BCH transmission bandwidth;

mapping the P2-BCH symbols to first and second transmission bands that have the BCH transmission bandwidth and locate within both bands adjoining the center frequency on both sides thereof and having a minimum reception bandwidth supportable by User Equipments (UEs) within a cell respectively, when a bandwidth of the system band is at least two times of the minimum reception bandwidth; and transmitting the P1-BCH and P2-BCH symbols to the UEs within the cell through subcarriers of the bands to which the symbols are mapped.

2. The method as claimed in claim 1, further comprising mapping the P1-BCH symbols to the first and second transmission bands, and transmitting the mapped P1-BCH symbols to the UEs within the cell, when the bandwidth of the system band is at least two times of the minimum reception bandwidth.

3. The method as claimed in claim 1, further comprising transmitting the basic system information to the UEs within the cell through an upper layer signaling control message.

4. The method as claimed in claim 1, further comprising exchanging first and second symbol blocks constituting the P1-BCH symbols with each other, and then mapping the exchanged symbol blocks to the middle band of the system band and transmitting the mapped symbol blocks after a time interval after the P1-BCH symbols are transmitted.

5. The method as claimed in claim 1, wherein the P1-BCH symbols includes two identical symbol blocks that are repeatedly transmitted in both bands with respect to the center frequency of the system band.

6. The method as claimed in claim 1, wherein the P1-BCH symbols includes the bandwidth of the system band, and selectively includes at least one of a number of transmit antennas and a CP (Cyclic Prefix) length.

7. An apparatus for transmitting a broadcast channel (BCH) in a cellular communication system supporting a scalable system bandwidth and employing multiple access technology, the apparatus comprising:
a broadcast channel encoder for generating first primary broadcast channel (P1-BCH) symbols including basic system information, and second primary broadcast channel (P2-BCH) symbols including core system information excluding the basic system information;
a subcarrier mapper for mapping the P1-BCH symbols to a middle band centered at a center frequency of a system band and having a BCH transmission bandwidth, and mapping the P2-BCH symbols to first and second transmission bands that have the BCH transmission bandwidth and locate within both bands adjoining the center frequency on both sides thereof and having a minimum reception bandwidth supportable by User Equipments (UEs) within a cell respectively, when a bandwidth of the system band is at least two times of the minimum reception bandwidth; and
a transmitter for transmitting the P1-BCH and P2-BCH symbols to the UEs within the cell through subcarriers of the bands to which the symbols are mapped.

8. The apparatus as claimed in claim 7, wherein the subcarrier mapper maps the P1-BCH symbols to the first and second transmission bands within both the bands, when the bandwidth of the system band is at least two times of the minimum reception bandwidth.

9. The apparatus as claimed in claim 7, wherein the basic system information is transmitted to the UEs within the cell through an upper layer signaling control message.

10. The apparatus as claimed in claim 7, wherein, after the P1-BCH symbols are transmitted, the subcarrier mapper exchanges first and second symbol blocks constituting the P1-BCH symbols with each other, and then maps the exchanged symbol blocks to the middle band of the system band and transmits the mapped symbol blocks after a time interval.

11. The apparatus as claimed in claim 7, wherein the P1-BCH symbols include two identical symbol blocks that are repeatedly transmitted in both bands with respect to the center frequency of the system band.

12. The apparatus as claimed in claim 7, wherein the basic system information includes the bandwidth of the system band, and selectively includes at least one of a number of transmit antennas and a CP (Cyclic Prefix) length.

13. A method of receiving a broadcast channel (BCH) in a cellular communication system supporting a scalable system bandwidth and employing multiple access technology, the method comprising the steps of:
receiving first primary broadcast channel (P1-BCH) symbols through a middle band centered at a center frequency of a system band and having a BCH transmission bandwidth;
acquiring basic system information by decoding the P1-BCH symbols;
receiving second primary broadcast channel (P2-BCH) symbols through at least one of first and second transmission bands that have the BCH transmission bandwidth and locate within both bands adjoining the center frequency on both sides thereof and having a minimum reception bandwidth supportable by User Equipments (UEs) within a cell respectively, when a bandwidth of the system band is at least two times of the minimum reception bandwidth; and
acquiring core system information excluding the basic system information by decoding the P2-BCH symbols.

14. The method as claimed in claim 13, further comprising receiving the P1-BCH symbols through at least one of the first and second transmission bands within both the bands, when the bandwidth of the system band is at least two times of the minimum reception bandwidth.

15. The method as claimed in claim 13, further comprising receiving the basic system information through an upper layer signaling control message.

16. The method as claimed in claim 13, wherein the step of receiving the P1-BCH symbols comprises:
receiving a first symbol block from among the first symbol block and a second symbol block, constituting the P1-BCH symbols, through a half of the middle band; and
receiving the second symbol block through a further half of the middle band after a time interval after the first symbol block is received.

17. The method as claimed in claim 13, wherein the step of receiving the P1-BCH symbols comprises receiving all symbols necessary for acquiring the basic system information through one half of the middle band.

18. The method as claimed in claim 13, wherein the basic system information includes the bandwidth of the system band, and selectively includes at least one of a number of transmit antennas and a CP (Cyclic Prefix) length.

19. An apparatus for receiving a broadcast channel (BCH) in a cellular communication system supporting a scalable system bandwidth and employing multiple access technology, the apparatus comprising:
a Fast Fourier Transform (FFT) block for converting a received signal within a desired reception band into a plurality of subcarrier symbols;
a subcarrier demapper for extracting first primary broadcast channel (P1-BCH) symbols through a middle band centered at a center frequency of a system band and having a BCH transmission bandwidth, and extracting second primary broadcast channel (P2-BCH) symbols through at least one of first and second transmission bands that have the BCH transmission bandwidth and locate within both bands adjoining the center frequency on both sides thereof and having a minimum reception bandwidth supportable by User Equipments (UEs) within a cell respectively, when a bandwidth of the system band is at least two times of the minimum reception bandwidth;
a first decoder for decoding the P1-BCH symbols to thereby acquire basic system information; and
a second decoder for decoding the P2-BCH symbols to thereby acquire core system information excluding the basic system information.

20. The apparatus as claimed in claim 19, wherein the subcarrier demapper extracts the P1-BCH symbols through at least one of the first and second transmission bands within both the bands, when the bandwidth of the system band is at least two times of the minimum reception bandwidth.

21. The apparatus as claimed in claim 19, wherein the first decoder acquires the basic system information by decoding an upper layer signaling control message.

22. The apparatus as claimed in claim 19, wherein the subcarrier demapper extracts a first symbol block from among the first symbol block and a second symbol block, constituting the P1-BCH symbols, through a half of the middle band, extracts the second symbol block through a further half of the middle band following a time interval after the first symbol block is received, and provides the first decoder with the extracted first and second symbol blocks.

23. The apparatus as claimed in claim 19, wherein the subcarrier demapper extracts all symbols necessary for acquiring the basic system information through one half of the middle band.

24. The apparatus as claimed in claim 19, wherein the subcarrier demapper extracts the P2-BCH symbols through the middle band of the system band, when the bandwidth of the system band is smaller than two times of the minimum reception bandwidth.

25. The apparatus as claimed in claim 19, wherein the basic system information includes the bandwidth of the system band, and selectively includes at least one of a number of transmit antennas and a CP (Cyclic Prefix) length.

* * * * *